Feb. 18, 1969 C. T. MERENDA ET AL 3,428,051
CIGAR SHAPE
Filed June 20, 1966
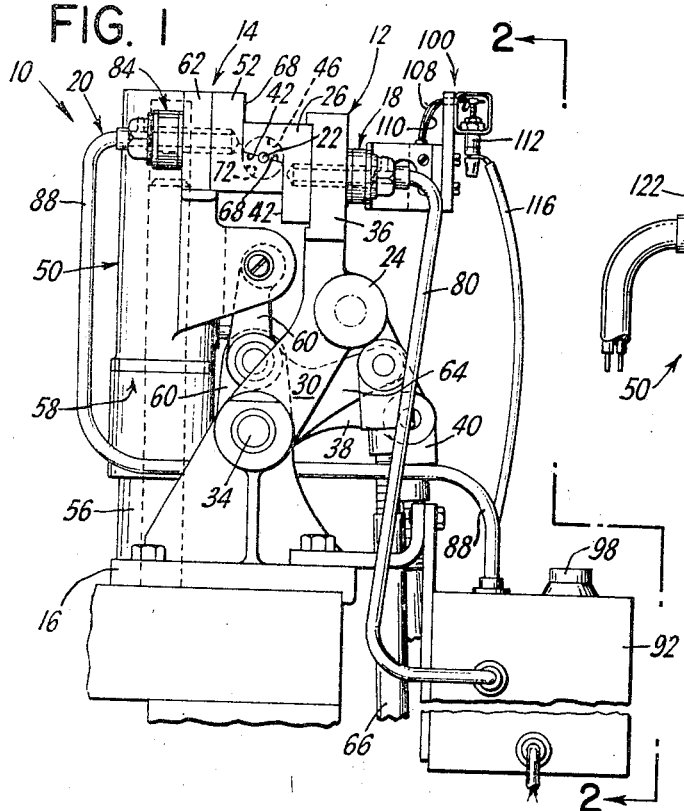
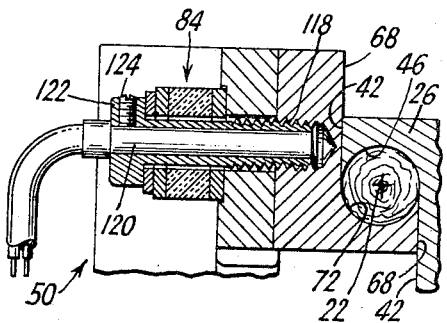
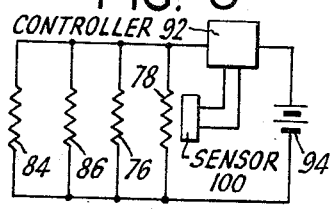
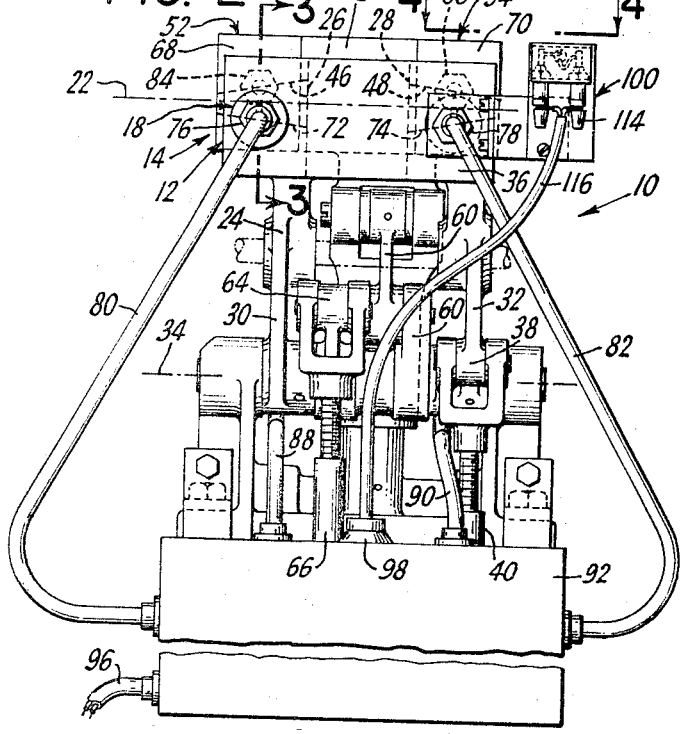
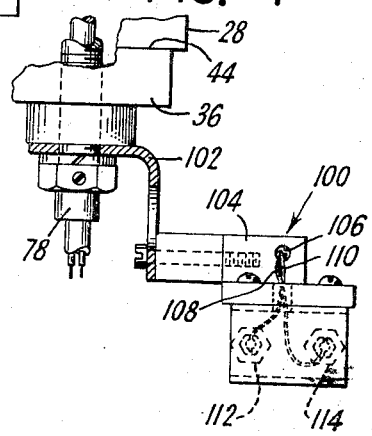
INVENTORS
CARMINE T. MERENDA
ADOLF F. REICH
STERLING T. GUSTAVSON
Thomas W. Kennedy
ATTORNEY

United States Patent Office 3,428,051
Patented Feb. 18, 1969

3,428,051
CIGAR SHAPER
Carmine T. Merenda and Adolf F. Reich, Brooklyn, and Sterling T. Gustavson, Rosedale, N.Y., assignors to American Machine & Foundry Company, a corporation of New Jersey
Filed June 20, 1966, Ser. No. 558,807
U.S. Cl. 131—79
Int. Cl. A24c 1/18, 3/00
3 Claims

ABSTRACT OF THE DISCLOSURE

A cigar shaper mechanism comprising a pair of movable shaping members adapted to clamp a cigar therebetween, each of said shaping members including a pair of axially spaced bearing plates contoured to shape the cigar. The bearing plates each have a heating element mounted in a hollow machine screw to simultaneously allow heating and pressing of the cigar.

---

The present invention relates to cigar making machines, and particularly to a cigar shaping mechanism.

A cigar shaping mechanism or cigar shaper is used to shape a cigar bunch into a desired form and configuration. The prior-art mechanism of this type is shown in U.S. Patent No. 2,331,906. Said prior-art mechanism includes a pair of shaping members and a base on which said shaping members are pivotally mounted.

One problem with said prior-art mechanism is that it is difficult to permanently shape a cigar which is composed of reconstituted tobacco. Another problem with said prior-art mechanism is that it is difficult to minimize surface wrinkles in the finished cigar.

In accordance with one embodiment of the present invention, shaping a cigar which is composed of reconstituted tobacco is facilitated and cigar surface wrinkles are minimized by using heat-applying shaping members.

Accordingly, it is one object of the invention to provide a shaping mechanism adapted to the shaping of a cigar, which is composed of reconstituted tobacco.

It is another object of the invention to provide a pressing mechanism for pressing a cigar to remove wrinkles in the outer surface thereof.

To the fulfillment of these and other objects, the invention provides a cigar shaper comprising a pair of oppositely-facing coacting shaping members, a base on which said shaping members are pivotally mounted, and a pair of heater units respectively connected to said shaping members for simultaneously shaping a cigar and for pressing the outer surface thereof.

Other objects of the invention will become apparent upon reading the following description and the accompanying drawings, wherein like parts are designated by like numerals throughout the several views, and wherein:

FIG. 1 is an end elevation view of a cigar shaping mechanism embodying features of the present invention;

FIG. 2 is a sectional view on line 2—2 of FIG. 1;

FIG. 3 is a sectional view on line 3—3 of FIG. 2;

FIG. 4 is a sectional view on line 4—4 of FIG. 2, and

FIG. 5 is an electrical circuit of the cigar shaping mechanism.

Referring to FIG. 1, one embodiment of the present invention is a cigar shaping and pressing mechanism 10. Cigar shaper 10 comprises a pair of oppositely-facing coacting front and rear shaping members 12, 14, a base 16, on which said shaping members 12, 14 are pivotally mounted, and a pair of front and rear heater units 18, 20, which are respectively connected to shaping members 12, 14 for simultaneously shaping a cigar (not shown) and pressing the outer surface thereof. Shaper 10 also has a reference axis 22, which is substantially coaxial with the cigar.

Front shaping member 12, which is on the front side of base 16, has a front support 24, which is movably connected to base 16. Shaping member 12 also has a pair of axially-spaced L-shaped jaws or bearing plates 26, 28. Front support 24 includes a pair of axially-spaced pivot arms 30, 32 which have a common pivot axis 34. Support 24 also has a crossbar 36, which is integral with arms 30, 32 and which supports plates 26, 28. Pivot arm 32 also has an eccentric lever 38, which has a cam rod 40 for pivoting front plates 26, 28 about axis 34. Front plates 26, 28 have respective inner surfaces 42, 44, which are substantially coplanar and which have respective grooves 46, 48 to receive the axially opposite ends of said cigars (not shown). Grooves 46, 48 are substantially semicircular in cross section and have a tapered profile, which converges in an axially outward direction.

Rear shaping member 14, which is disposed on the rear side of base 16, has a rear sliding support 50, which is also movably connected to base 16. Shaping member 14 also has a pair of axially-spaced L-shaped jaws or rear bearing plates 52, 54, which are respectively disposed opposite the front plates 26, 28.

Rear support 50 includes a shaft 56, which is fixedly connected to base 16, a sliding sleeve 58, which is journaled on shaft 56 for displacement relative thereto, a toggle 60, which is pivotally connected to base 16 for actuating sleeve 58, and a crossbar 62, which is fixedly connected to sleeve 58 and which supports plates 52, 54. Toggle 60, which also pivots about axis 34, has an eccentric lever 64 with a cam rod 66, which pivots about axis 34 for displacing rear plates 52, 54 in a direction substantially parallel to shaft 56.

Rear plates 52, 54 also have respective inner surfaces 68, 70, which are substantially coplanar and which have respective grooves 72, 74 to receive the axially opposite ends of said cigar. Grooves 72, 74 are also substantially semicircular in cross section and have a tapered profile, which converges in an axially outward direction.

Front heater unit 18 includes a pair of axially-spaced heater-bar resistors 76, 78, which are respectively connected to front plates 26, 28. Front resistors 76, 78 have respective flexible leads 80, 82.

Rear heater unit 20 (FIGURES 1, 2) includes a pair of axially-spaced heater-rod resistors 84, 86, which are respectively connected to rear plates 52, 54. Rear resistors 84, 86 have respective flexible leads 88, 90 (FIGURE 2).

Heater units 18, 20 have an automatic temperature controller 92 for setting the operating temperature of plates 26, 28, 52, 54 and for minimizing variation in said temperature. Controller 92 is connected to resistor leads 80, 82, 88, 90 (FIGURE 1), thereby being connected in parallel to resistors 76, 78, 84, 86 (FIGURE 5). Controller 92 has a power supply 94 (FIGURE 5), which has a power supply lead 96 (FIGURE 2). Controller 92 also has means for varying the current to resistors 76, 78, 84, 86, for setting the operating temperature of plates 26, 28, 52, 54, which includes a manual temperature-adjusting dial 98. Controller 92 also has a feedback sensor 100, which is connected to front resistor 78 for sensing the temperature thereof and for minimizing changes in said temperature.

Sensor 100 (FIGURES 1, 2, 4) includes a conductor bracket 102, which is composed of heat conducting material and which is fixedly connected to resistor 78 for conducting heat therefrom. Sensor 100 also includes a heat sink 104, which is connected to conductor 102 to receive heat flow therefrom, a temperature probe 106, which is embedded in heat sink 104, a pair of probe wires 108, 110, which are connected to probe 106, a pair of terminals 112, 114, which are respectively connected to wires 108, 110, and a lead 116, which is connected to terminals 112, 114.

Resistor 84 (FIGURE 3), which is substantially identical in construction of resistors 76, 78, 86, is described hereafter in detail. Resistor 84 includes a hollow machine screw 118, and a high-temperature resistance element 120, which is received by hollow screw 118. Hollow screw 118 connects plate 68 to bar 62 for support of plate 68 therefrom, and also conducts heat from element 120 to plate 68. Hollow screw 118 also has a head portion 122, and has a set screw 124, which is threaded therein for fixedly connecting element 120 thereto.

With this construction of shaper 10, the rate of production of cigars can be substantially increased, the variation in cross section and the variation in profile dimensions of successive cigars can be minimized, and the variation in surface roughness of successive cigars can be minimized.

In summary, this invention provides a shaping mechanism adapted to the shaping of a cigar, which is composed of reconstituted tobacco, and adapted to the pressing of a cigar to remove wrinkles in the outer surface thereof.

What is claimed is:

1. A cigar shaper comprising a pair of oppositely facing coacting shaping members having a longitudinal axis and being relatively movable with respect to each other whereby a cigar may be fixedly positioned therebetween, each of said shaping members comprising corresponding axially spaced contoured bearing plates for shaping the ends of said cigar and being connected to each other by a longitudinal extending crossbar, a heater unit inserted into each of said bearing plates, said heating units each comprising a resistance element mounted within a hollow machine screw supported within a respective one of said crossbars and threaded to a corresponding one of said bearing plates for fixing said plates to said crossbars, and simultaneously holding a portion of a corresponding one of said resistance elements in a corresponding one of said bearing plates.

2. The cigar shaper as claimed in claim 1 including a first support for one of said shaping members pivotally mounted about an axis disposed substantially parallel to the longitudinal axis, a second support for the other of said shaping member comprising toggle means connected to said pivotal support and coaxial therewith for positioning said cigar within said shaping members in clamping relation when shaping said cigar.

3. A cigar shaper as claimed in claim 2, in which:
said resistance elements have a common controller with a power supply and are connected in parallel therewith, and
said controller has a feedback sensor disposed adjacent to one of said resistance elements to sense the temperature thereof.

References Cited

UNITED STATES PATENTS

| 146,126 | 1/1874 | Dombrowsky | 131—79 |
|---|---|---|---|
| 1,718,127 | 6/1929 | Fitzgerald et al. | 131—87 X |
| 2,314,734 | 3/1943 | Ptasnik | 131—79 |
| 2,331,906 | 10/1943 | Halstead | 131—89 |
| 2,633,135 | 3/1953 | Neumair | 131—87 X |
| 3,172,411 | 3/1965 | Cain et al. | 131—79 |
| 3,205,899 | 9/1965 | Ackermann | 131—79 X |
| 3,213,263 | 10/1965 | Steenbergen | 219—205 |

SAMUEL KOREN, *Primary Examiner.*

JAMES H. CZERWONKY, *Assistant Examiner.*

U.S. Cl. X.R.

131—85, 92